(12) United States Patent
Salvatore

(10) Patent No.: US 11,545,879 B2
(45) Date of Patent: Jan. 3, 2023

(54) METHOD AND SYSTEM FOR HANDLING A ROTARY MACHINE

(71) Applicant: Domenick Salvatore, Budd Lake, NJ (US)

(72) Inventor: Domenick Salvatore, Budd Lake, NJ (US)

(*) Notice: Subject to any disclaimer, the term of this patent is extended or adjusted under 35 U.S.C. 154(b) by 0 days.

(21) Appl. No.: 17/539,299

(22) Filed: Dec. 1, 2021

(65) Prior Publication Data
US 2022/0181952 A1 Jun. 9, 2022

Related U.S. Application Data

(62) Division of application No. 16/181,622, filed on Nov. 6, 2018, now abandoned.

(51) Int. Cl.
*H02K 15/00* (2006.01)
*H02K 15/16* (2006.01)

(52) U.S. Cl.
CPC ......... *H02K 15/0006* (2013.01); *H02K 15/16* (2013.01)

(58) Field of Classification Search
CPC .............. H02K 15/0006; H02K 15/16; Y10T 29/53143
See application file for complete search history.

(56) References Cited

U.S. PATENT DOCUMENTS

| | | | |
|---|---|---|---|
| 2,624,473 A | 1/1953 | Conder | |
| 3,055,420 A * | 9/1962 | Del Faro | A47H 15/02 160/347 |
| 4,157,613 A | 6/1979 | Morrow | |
| 4,451,979 A | 6/1984 | Schuster | |
| 5,383,652 A | 1/1995 | VanDen Berg | |
| 9,908,712 B2 | 3/2018 | Edwards et al. | |
| 2004/0055138 A1 | 3/2004 | Tomko et al. | |
| 2007/0193014 A1 | 8/2007 | Henley | |
| 2009/0255104 A1 | 10/2009 | Gillivan et al. | |
| 2010/0154201 A1 | 6/2010 | Pervaiz | |
| 2016/0285348 A1 | 9/2016 | Klejc et al. | |

* cited by examiner

*Primary Examiner* — Livius R. Cazan
(74) *Attorney, Agent, or Firm* — Michael J. Feigin, Esq.; Feigin and Fridman LLC

(57) ABSTRACT

A method and system for handling a rotor and a stator of a rotary machine employs a frame and a carriage. The carriage rides on and is guided by a parallel pair of tracks that extend away from the frame. The frame and tracks both rest on a horizontal surface. The stator can be placed on the carriage and the frame can be used to provide support to the rotor. A force may be applied between the rotor and stator in a direction to move the carriage relative to the frame.

10 Claims, 8 Drawing Sheets

METHOD AND SYSTEM FOR HANDLING A ROTARY MACHINE

CROSS REFERENCE TO RELATED APPLICATION

This application is a divisional application based on U.S. application Ser. No. 16/181,622, filed Nov. 6, 2018, the contents of which are incorporated by reference herein.

BACKGROUND OF THE INVENTION

1. Field of the Invention

The present invention relates to the handling of rotary machines, and in particular, to assembling and disassembling a rotor and stator of a rotary machine.

2. Description of Related Art

Rotary machines such as electrical motors and electrical generators will require maintenance after they have been in service for an extended period of time. Often maintenance will require removing a rotor from a stator in order to gain access to the features requiring maintenance.

These rotary machines may be rather large and heavy so that the disassembly and assembly process will present many challenges. The larger machines cannot be handled without mechanical assistance. Cranes and rigging are typically needed to move the machine and its components. Setting up a crane and rigging can be time-consuming, and especially difficult when there is little space available in the room containing the machine.

As an example, the electrical motor that operates an elevator will be a heavy machine located high in a building, making transportation of the machine to a remote service location rather difficult. For this reason, maintenance is typically performed in the field. Also, maintenance of an elevator motor is further complicated by the fact that the rotor will typically be connected to a relatively heavy sheave.

By design, the spacing between a rotor and stator is kept small, in order to increase machine efficiency. However, when moving a rotor into or out of a stator, small misalignments may cause damage should the rotor and stator collide. Thus, care must be taken to keep the rotor coaxial to the stator, although precise alignment is difficult when dealing with heavy components suspended by a crane or by rigging.

See also U.S. Pat. Nos. 2,624,473; 4,157,613; 4,451,979; and 9,908,712, as well as US Patent Application Pub. Nos. 2004/0055138; 2007/0193014; 2009/0255104; 2010/0154201; and 2016/0285348.

SUMMARY OF THE INVENTION

In accordance with the illustrative embodiments demonstrating features and advantages of the present invention, there is provided a method for handling a rotor and a stator of a rotary machine. The method employs a frame and a carriage. The method includes the step of placing the stator on the carriage. The method also includes the step of using the frame to provide support to the rotor. Another step is applying a force between the rotor and stator in a direction to move the carriage relative to the frame.

In accordance with another aspect of the invention, there is provided a system for handling a rotor and a stator of a rotary machine. The system includes a frame adapted to rest on a horizontal surface. The system also includes a parallel pair of tracks adapted to rest on the horizontal surface and extend away from the frame. Also included is a carriage riding on and guided by the pair of tracks. The carriage is adapted to carry the stator.

By employing systems and methods of the foregoing type an improved technique is achieved for handling a rotary machine having a rotor and stator. In a disclosed embodiment a four-legged frame supports at its upper end a pair of parallel crossbeams. The lower ends of the legs of the disclosed frame are connected to a parallel pair of struts, with two adjacent legs attached to one of the struts and the other two legs attached to the other strut. The disclosed struts are transverse to the crossbeams at the top of the frame.

In this embodiment a pair of tracks having J-shaped cross-sections are attached to the disclosed struts. A maintenance technician can change how far the tracks extend from the frame by disconnecting the tracks and reconnecting them at a different location. Riding in the tracks is a carriage, which is shown as two independent devices that ride in the tracks. A stator can be placed atop the support members of the two independent devices. The spacing between the independent devices can be adjusted to accommodate the size of the stator that is being carried.

Each of the disclosed carriage devices has a transverse support member connected between a pair of trolleys that are riding in different tracks. Each trolley has a pair of wheels rotatably mounted on a plate.

The foregoing apparatus can be used to assemble a rotary machine, namely by facilitating insertion of a rotor into a stator. This process may be part of a maintenance routine or may be part of the procedure involved in manufacturing new machines. In any event, a stator may be placed atop the foregoing carriage and held in place with C-clamps or other devices. On the other hand, the weight of the stator may be such that clamping is unnecessary. A dolly may be used to bring a rotor next to this stator. The rotor can then be hoisted by a chain that is secured to a crossbeam atop the frame, and on the lower end to an aperture in a plate that is temporarily attached to the rotor or to hardware attached to the rotor (e.g. a sheave). A come-along winch deployed between the crossbeam and the chain may be used to pull the chain up and lift the rotor off the dolly.

Due to the asymmetrical connection point of the chain to the rotor, the end of the rotor nearest the stator will have a tendency to dip down. This tendency can be overcome by placing a sling around the rotor (or around a sheave connected to the rotor). The sling will be further from the stator than the chain and will be attached to two opposing rigging plates at the bottom of the frame. The sling can be a fabric belt with one end attached directly to one of the rigging plates and the other end connected through a chain and come-along winch to the opposite rigging plate. Accordingly, downward pressure from the sling can raise the end of the rotor closest to the stator. Precise coaxial alignment can be achieved between the rotor and stator by using the sling to adjust the angle of elevation of the rotor and by using the hoist chain to lift/lower the rotor.

Thereafter, a first brace is placed at the far end of the stator. This first brace is connected by rigging to a second brace at the opposite end of the rotor. A hydraulic actuator is placed between the second brace and the rotor to drive the rotor and stator together. This closing motion is accommodated by movement of the carriage, which brings the stator closer to the rotor.

The foregoing apparatus can also be used to disassemble a rotary machine. In a disclosed embodiment a brace is connected to one end of the stator by jackscrews. A hydraulic actuator is placed between this brace and the rotor inside the stator, and will be used to push the rotor out of the stator. In a manner similar to that previously described, a chain suspended from one of the crossbeams can be hooked onto the emerging rotor (or hardware attached to the rotor). As the rotor continues to emerge, a sling supported by another one of the crossbeams can support the newly emerging sections of the rotor to prevent misalignment that can damage the rotor and stator. Specifically, the upward force of the sling can be adjusted using a chain and come-along winch. This force adjustment will adjust the angle of elevation of the rotor to prevent misalignment and damage. This separating motion is accommodated by movement of the carriage, which carries the stator further from the rotor.

BRIEF DESCRIPTION OF THE DRAWINGS

The above brief description as well as other objects, features and advantages of the present invention will be more fully appreciated by reference to the following detailed description of illustrative embodiments in accordance with the present invention when taken in conjunction with the accompanying drawings, wherein.

DETAILED DESCRIPTION

Figure 1:
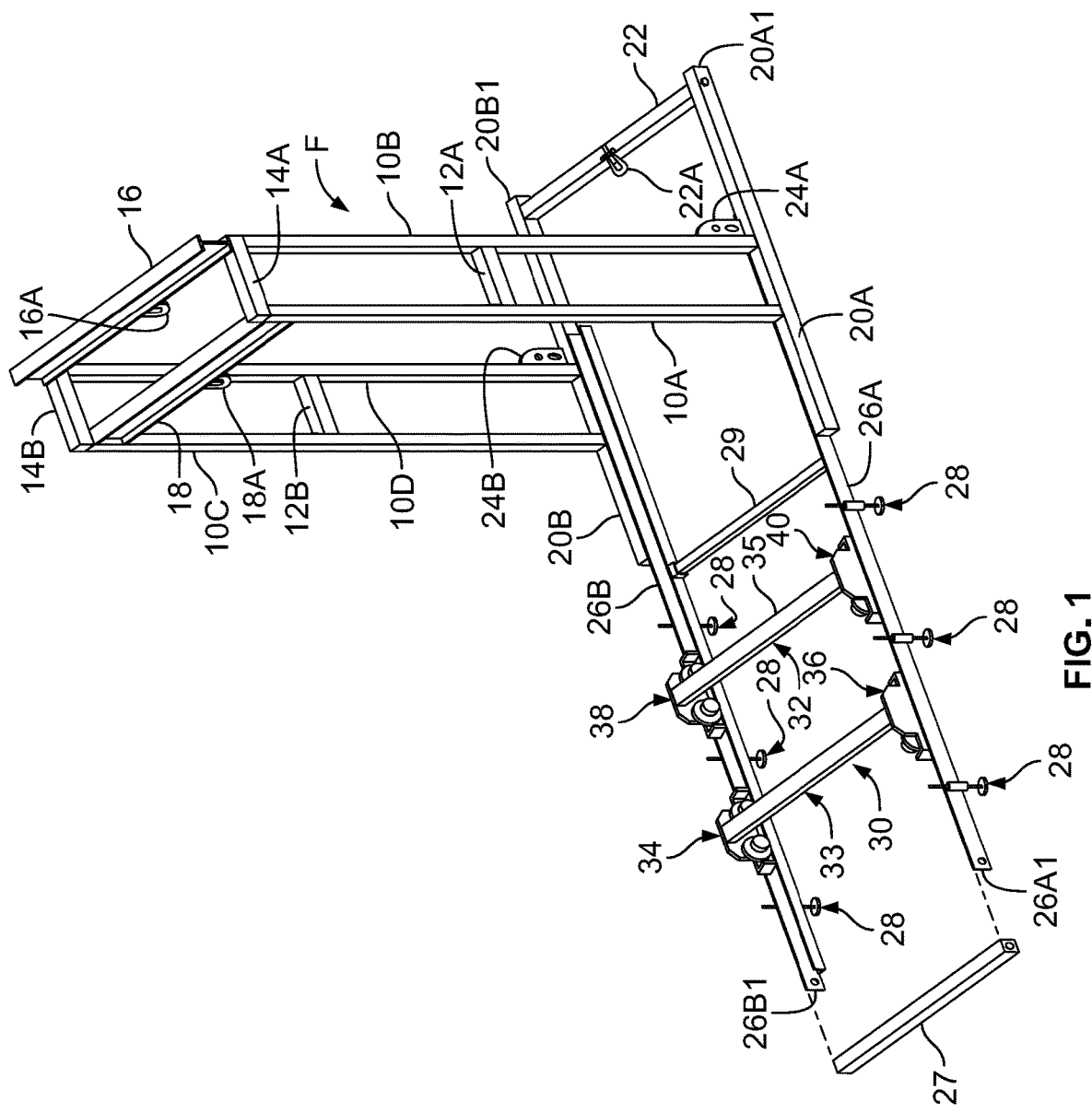
FIG. 1 is a perspective view of a system providing a method for handling a rotor and a stator of a rotary machine.

Referring to FIG. 1 the illustrated system can be used to handle a rotary machine. The system includes a frame F having four upright legs 10A, 10B, 10C, and 10D (collectively legs 10). Legs 10A and 10B are spanned on top by strut 14A and reinforced in the middle by strut 12A. Legs 10C and 10D are spanned on top by strut 14B and reinforced in the middle by strut 12B. (Struts 14A and 14B collectively referred to as struts 14. Struts 12A and 12B collectively referred to as struts 12.) In this embodiment, legs 10 and struts 12, 14 and 20 are square tubes, although struts with different configurations may be used in other embodiments.

Crossbeam 16 is mounted upon the right ends of struts 14 in this view and may be secured by welding and/or by the use of brackets (not shown) that are welded between beam 16 and struts 14. Crossbeam 18 is attached between the upper ends of legs 10A and 10C, immediately below struts 14. Crossbeam 18 may be secured by welding and/or by the use of brackets (not shown) that are welded between beam 18 and legs 10A and 10C.

In this embodiment crossbeams 16 and 18 are shown as I beams, although other types of beams may be used in different embodiments. Also, attached to the undersides of crossbeams 16 and 18 are upper hitches 16A and 18A, respectively. Hitches 16A and 18A and may be U-shaped metal shackles bolted to tabs (not shown) welded to the underside of crossbeams 16 and 18.

The lower ends of the adjacent pair of legs 10A and 10B are welded to the middle of the topside of strut 20A. The lower ends of the adjacent pair of legs 10C and 10D are welded to the middle of the topside of strut 20B. Struts 20A and 20B may be square tubes and are oriented to be perpendicular to crossbeams 16 and 18. Bolted between the distal ends 20A1 and 20B1 of struts 20 is a cross member 22 having a lower hitch 22A in the form of a U-shaped metal shackle bolted to a metal tab on the cross member 22.

Rigging plate 24A is welded into the outside corner formed between leg 10B and strut 20A. See also FIG. 7. In a similar fashion, rigging plate 24B is welded into the outside corner formed between leg 10D and strut 20B. The legs 10B and 10D associated with rigging plates 24A and 24B are herein referred to as a given pair of upright legs. Rigging plates 24A and 24B are flat plates each having a rounded, upper outside corner and each having an upper circular aperture above a lower oval aperture.

Figure 2:
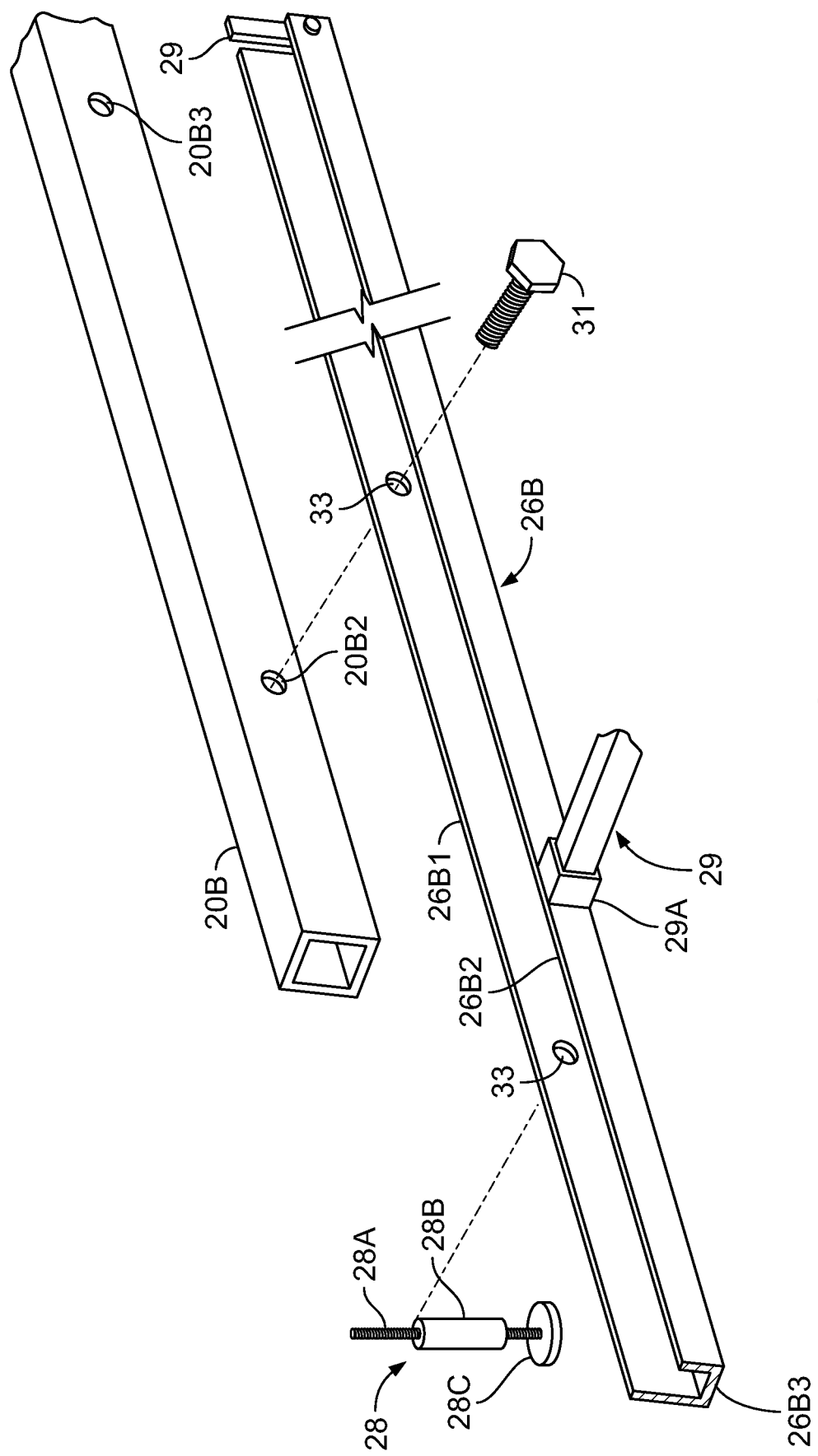
FIG. 2 is an exploded, perspective view of a portion of a strut and track in the system of FIG. 1.

A parallel pair of tracks 26A and 26B (collectively tracks 26) are attached to the inside faces of struts 20A and 20B, respectively. Each of the tracks 26 have a J-shaped cross section. As shown in FIG. 2, track 26B has an upright flange 26B1, and a shorter upright flange 26B2 that are connected below by web 26B3. Flange 26B1 has a number of spaced holes 33, one of them shown accepting bolt 31, which is screwed into threaded hole 20B2 of strut 208. One or more additional bolts can be used to connect strut 20B to track 26B in a similar fashion.

It will be appreciated that bolt 31 can be connected instead to threaded hole 20B3 in order to decrease the length of track 26B extending beyond strut 20B. In this manner the amount of extension of track 26B can be increased or decreased depending upon how the track is bolted to strut 20B. A similar adjustment regime will be employed for strut 20A and track 26A of FIG. 1.

As shown in FIG. 1, three adjustable feet 28 are attached to the outside of each of the tracks 26 (six feet altogether). A shown in FIG. 2, foot 28 has a threaded shaft 28A threadably mounted in collar 28B, which is welded to the outside of flange 26B1. A support disk 28C is attached to the lower end of shaft 28A. Accordingly, disk 28C can be rotated to turn shaft 28A and thereby raise or lower the disk. From FIG. 1, feet 28 can be vertically adjusted to level the tracks 26.

Reinforcing brace 29 of FIG. 1 is connected between the inside faces of tracks 26. As shown in FIG. 2 a rectangular socket 29A is mounted on the inside face of flange 26B2 to receive an end of brace 29. A similar socket (not shown) exists on the inside face of track 26A.

As shown in FIG. 1 the shorter, inside flange and the web of track 26B (i.e., flange 26B2 and web 26B3 of FIG. 2) are cut short so that flange 26B1 extends by itself at the distal end of track 26B. Likewise, flange 26A1 extends by itself from the distal end of track 26A. Crosstie 27 can be bolted between these distal extensions of flanges 26A1 and 26B1.

In FIG. 1, a carriage is shown as two identical trolleys 30 and 32. Trolley 30 has a support member 33 connected between riders 34 and 36. Trolley 32 has a support member 35 connected between riders 38 and 40.

Figure 3:
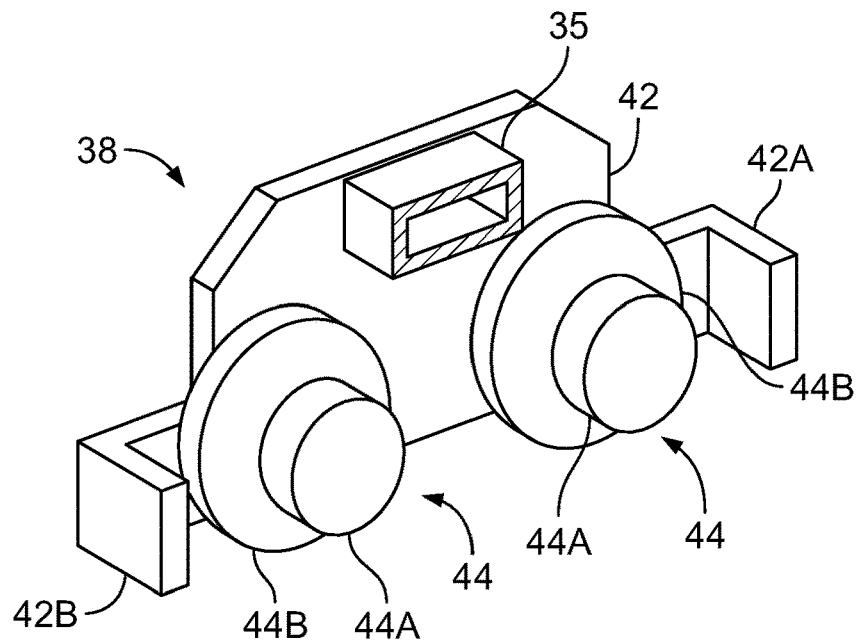
FIG. 3 is a fragmentary view of one of the riders of a trolley in FIG. 1.

In FIG. 3 rider 38 is shown with a fragment of support member 35 welded to plate 42. The main section of plate 42 is rectangular with bevelled upper corners. The lower corners of plate 42 have inwardly bent arms 42A and 42B. Arm 42A will engage stop 29 (FIG. 2) to limit the travel of rider 38. Stop 29 is shown as a vertical bar bolted to the inside face of flange 26B2. A similar stop will be installed on track 26A.

Figure 4:
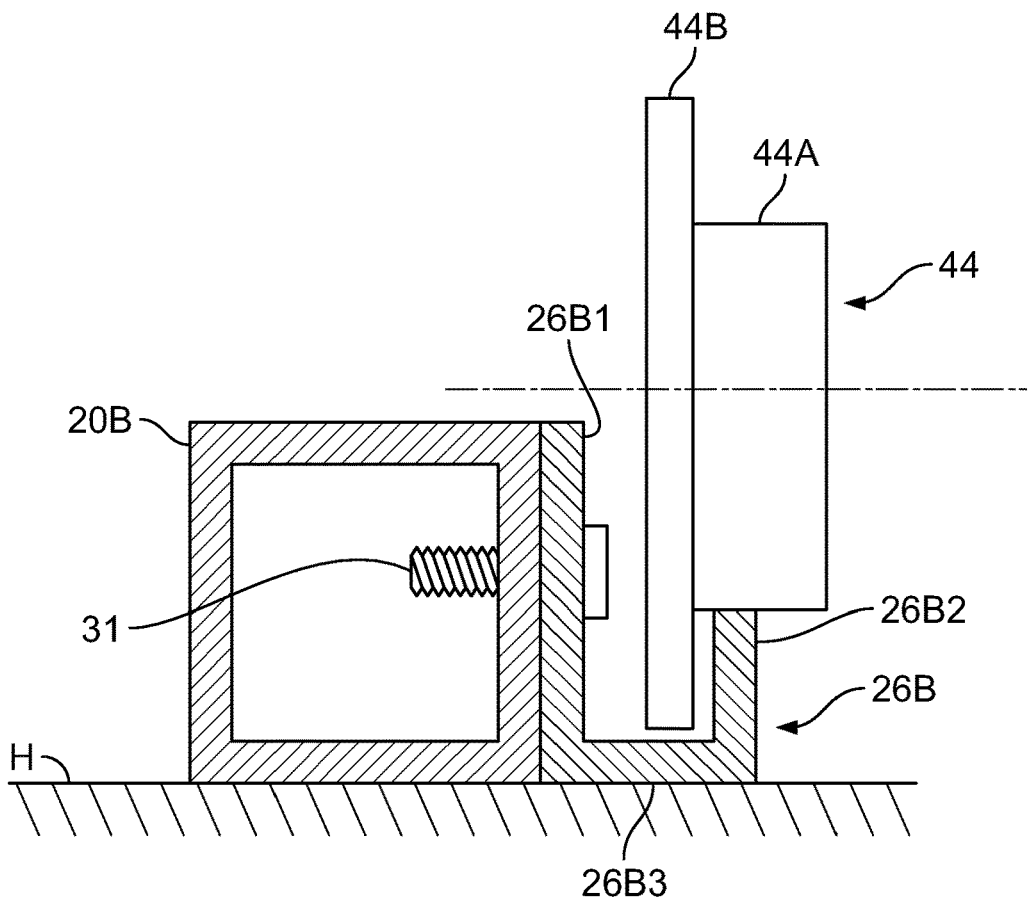
FIG. 4 is a cross-sectional view of a strut, a track, and a wheel of FIG. 1.

Journalled on plate 4 are a side-by-side pair of wheels 44. Each of the wheels 44 has a cylindrical drum 44A that is integral with a concentric circular flange 44B. As shown in FIG. 4, drum 44A rides on the upper edge of shorter flange 26B2 of track 26B. Flange 44B stays adjacent to the inside face of flange 26B2 of guide wheel 44. Also, strut 20B and track 26B are shown resting on horizontal surface H.

Figure 5A:
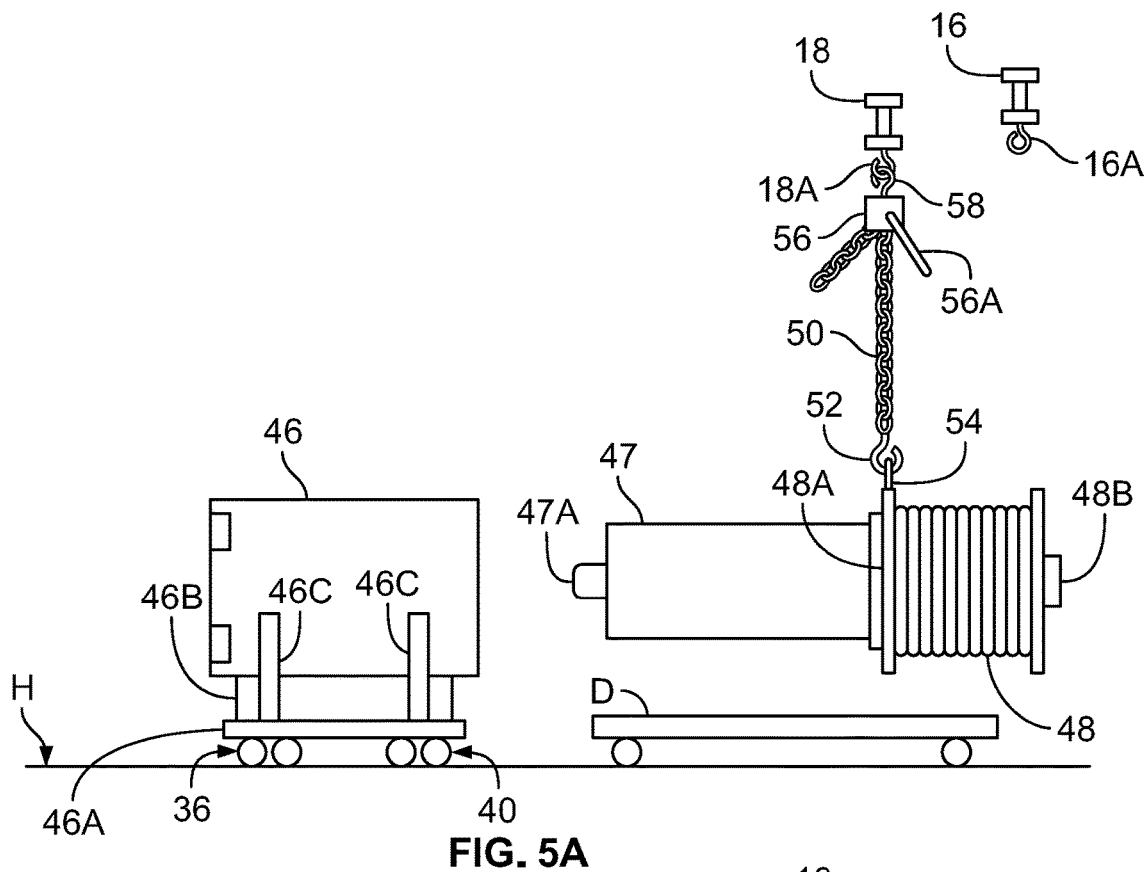
FIG. 5A is an elevational view illustrating a separated rotor and stator about to be assembled using the system of FIG. 1.

To facilitate an understanding of the principles associated with the foregoing system, its operation will be briefly described. In FIG. 5A stator 46 is supported on the previously mentioned carriage. The wheels of riders 36 and 40 are schematically illustrated in this Figure (the carriage itself will now be referred to as carriage 36/40).

Stator 46 is shown with a base plate 46A. Pedestal 46B extends from plate 46A to the underside of the main body of stator 46. A number of reinforcing ribs 46C (two per side) extend from plate 46A to a lower lateral sector of stator 46.

Stator 46 may be placed on carriage 36/40 by a crane (not shown). Base plate 46A may be secured to carriage 36/40 (specifically to support members 33 and 35 of FIG. 1) with C clamps (not shown), although in some cases the weight of stator 46 may be sufficient to keep the stator in place without clamping. Also, shims may be used to level stator 46. The level of stator 46 may be checked with a leveling device, such as a spirit level or line level.

Stator 46 may be part of an electrical motor or part of an electrical generator that cooperates with rotor 47, which is discussed below.

Cross member 22 (FIG. 1) is temporarily removed so that dolly D (FIG. 5A) can carry rotor 47. In particular, rotor 47 will travel under crossbeams 16 and 18, and between struts 20 (FIG. 1). In this case, rotor 47 is connected to elevator sheave 48, and is adjacent to sheave flange 48A. Accordingly, this rotary machine is acting as an electrical motor in this embodiment.

Figure 6:
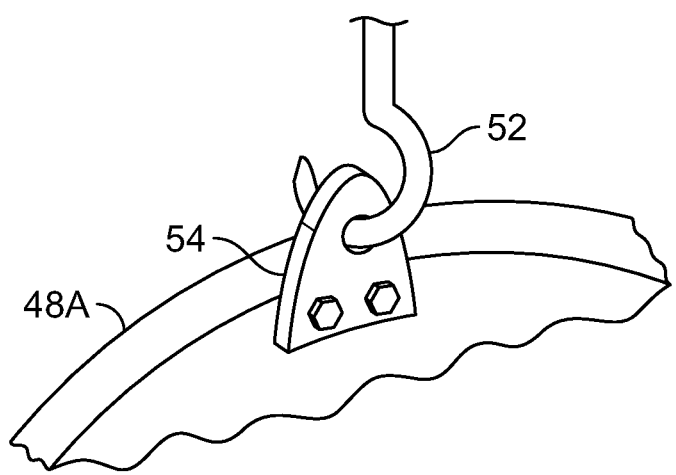
FIG. 6 is fragmentary view of a plate attached to the flange of the sheave as shown in FIG. 5A.

As shown in FIG. 6, connecting plate 54 is bolted to an inside face of flange 48A to extend upwardly beyond the flange. Hook 52 is shown hooked through an upper aperture in plate 54. In FIG. 5A, hook 52 is connected through chain 50 to come-along winch 56, which has a hook 58 hooked into previously mentioned hitch 18A of crossbeam 18. By reciprocating winch lever 56A an upward force is applied by the come-along winch 56 through chain 50 to lift rotor 47 as shown. Chain 50 is herein referred to as a line for applying an upward force to a first location. With rotor 47 elevated, dolly D can be removed before reinstalling the cross member (cross member 22 of FIG. 1).

While there may at this time be some unbalance and tilting of the rotor 47, the associated tilting forces can be overcome manually, at least initially.

Figure 5B:
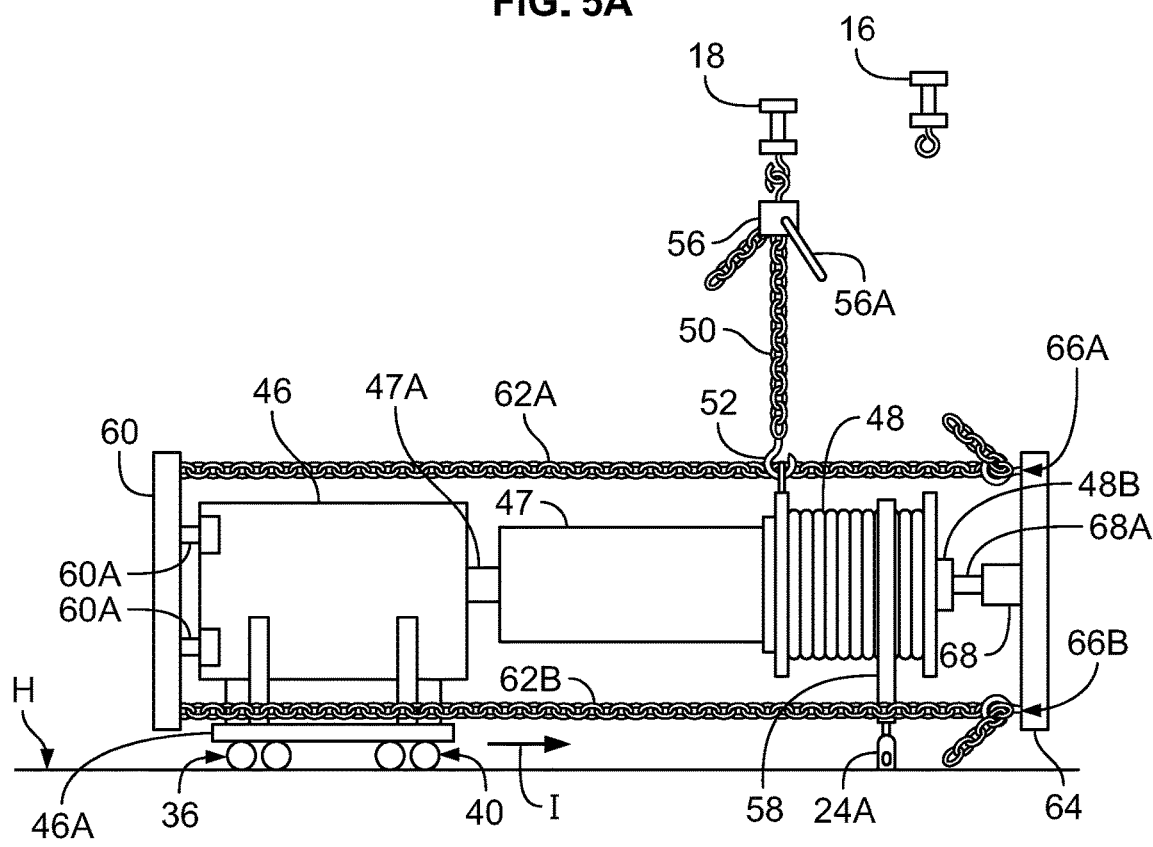
FIG. 5B is an elevational view illustrating braces and rigging fitted on a rotor and stator of FIG. 5A in order to assemble them using the system of FIG. 1.
Figure 7:
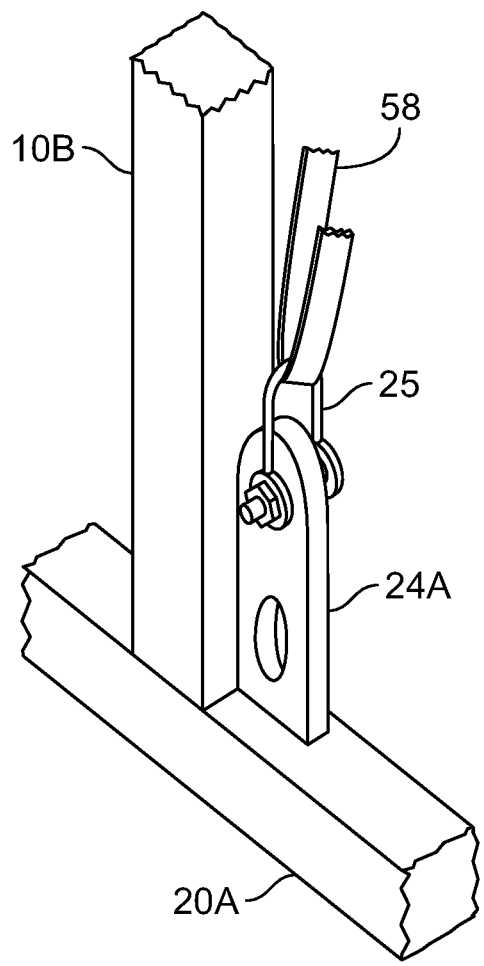
FIG. 7 is detailed, fragmentary view of the rigging plate of FIG. 1 being used as shown in FIG. 5B.

Referring to FIG. 5B, rotor tilting is handled in a more controlled and accurate fashion. Specifically, strap 58 is wrapped over sheave 48 to apply a downward force at a second location that is further from stator 46 than chain 50. Accordingly, this downward force can cause rotor 47 to pivot about hook 52. As shown in FIG. 7, strap 58 is looped through a shackle 25 that is bolted to an upper aperture of rigging plate 24A (i.e., above the lower, oval aperture). The opposite end of strap 58 is connected through a come-along winch (not shown) to the other rigging plate 24B (FIG. 1).

The operator can verify that rotor 47 is horizontal by using a leveling device, e.g. a spirit level or line level. In addition to adjusting the angle of elevation by adjusting the downward force of strap 58, the height of rotor 47 can be adjusted by using come-along winch 56.

Figure 8:
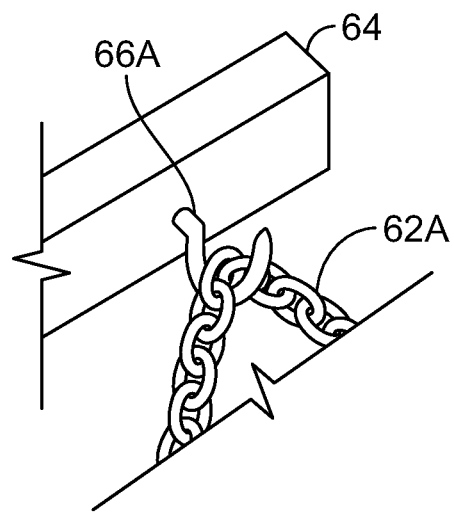
FIG. 8 is detailed, fragmentary view showing the connection of the rigging of FIG. 5B to one end of one of the braces.

In FIG. 5B a first brace 60 is pressed against stator 46 by rigging, namely by chains 62A and 6B (collectively rigging 62). Wooden blocks 60A are placed between brace 60 and the remote end of stator 46 to prevent damage to the stator. The opposite ends of rigging 62 are connected to hooks 66A and 66B of second brace 64. See also FIG. 8. A hydraulic-jack 68 is positioned against the inside of brace 64, with its piston rod 68A bearing against journal 48B of sheave 48 to apply force between brace 64 and the rotor. In this embodiment, braces 60 and 64 are parallel, rectangular bars and are angled at 45° from horizontal.

By a extending jack 68, brace 64 moves away from rotor 47 to pull rigging 62. Consequently, brace 60 pushes stator 46 so it travels on carriage 36/40 in the direction of arrow I toward rotor 47 (i.e. toward the frame F and brace 64). When jack 68 is fully extended, it can be retracted, and the resulting slack in rigging 62 can be taken up by hooking the hooks 66A and 66B to different, inwardly located links of the rigging chains 62A and 62B. Thereafter, jack 68 can be redeployed and again used to pull the stator 46 further onto rotor 47.

Figure 5C:
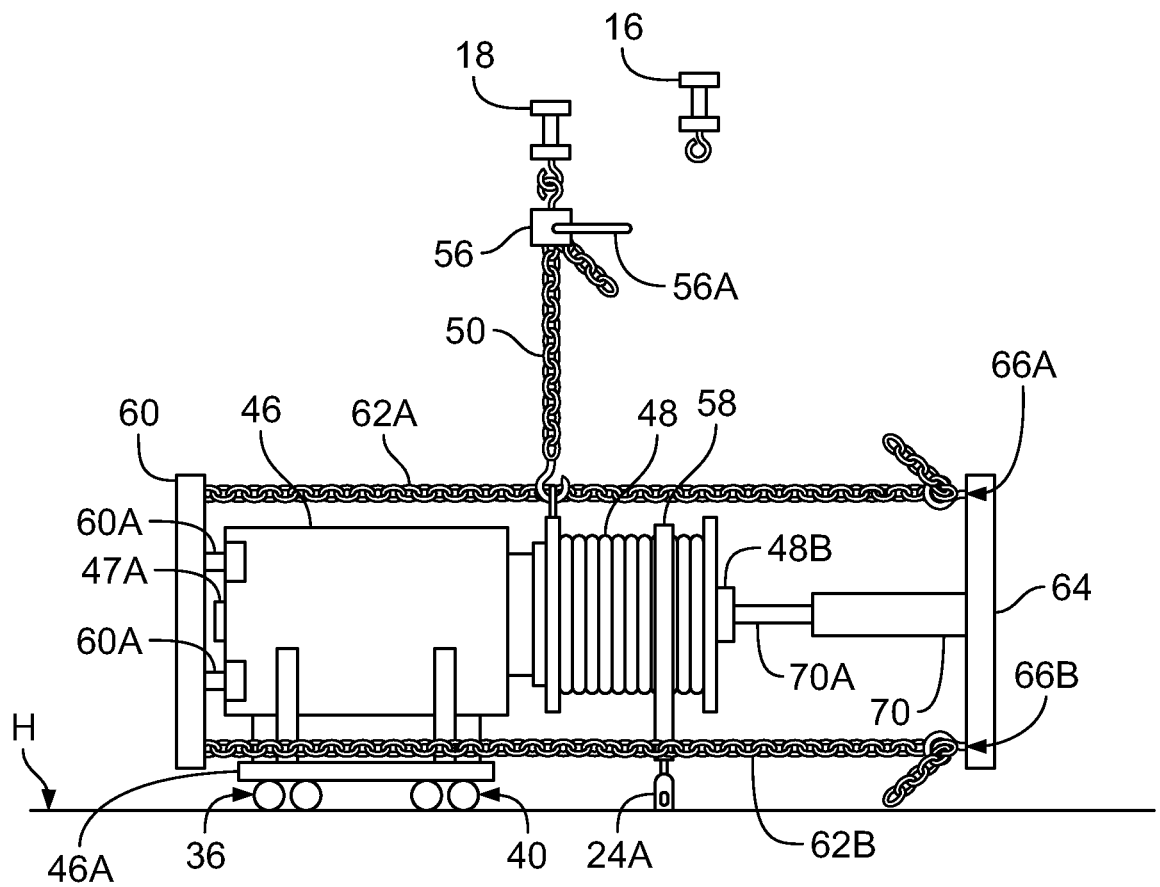
FIG. 5C is an elevational view illustrating a rotor fully lodged in a stator and completing the assembly method using the system of FIG. 1.

In FIG. 5C a different hydraulic jack 70 has been positioned between brace 64 and journal 48B. Jack 70 has a longer cylinder and consequently a longer piston rod 70A. In this Figure jack 70 has pulled stator 46 completely over the rotor, bringing the stator next to sheave 48 so that the rotor is fully lodged inside the stator. This completes the installation process and the assembly can be lifted off carriage 36/40 by disconnecting strap 58 and pulling chain 50 upwardly using come-along winch 56. At the same time, the operator can disconnect rigging 62, jack 70, and braces 60 and 64. Thereafter, the assembly can be lowered onto a dolly, disconnected from chain 50 and plate 54, and moved to another location.

Figure 9A:
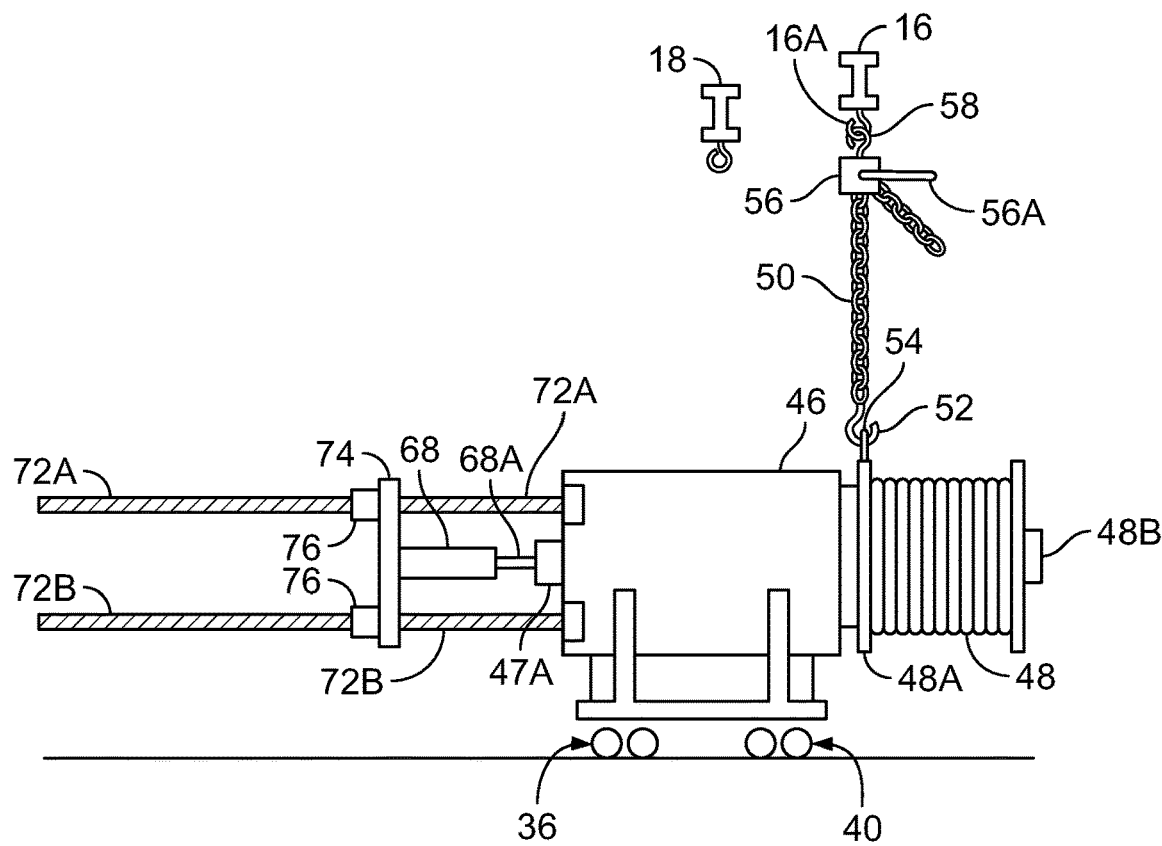
FIG. 9A is an elevational view illustrating a rotary machine about to be disassembled using the system of FIG. 1.
Figure 9B:
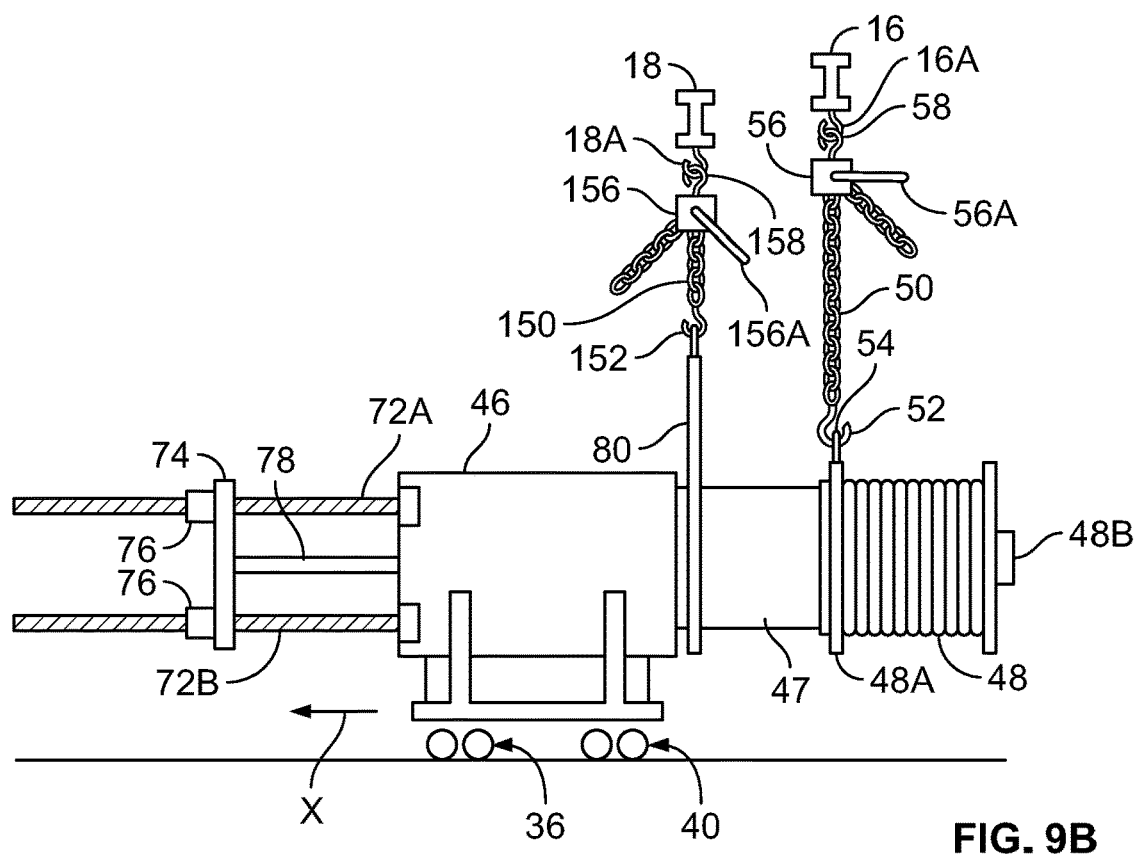
FIG. 9B is an elevational view illustrating a brace fitted on a stator and being used to dislodge a rotor from the stator using the system of FIG. 1.
Figure 9C:
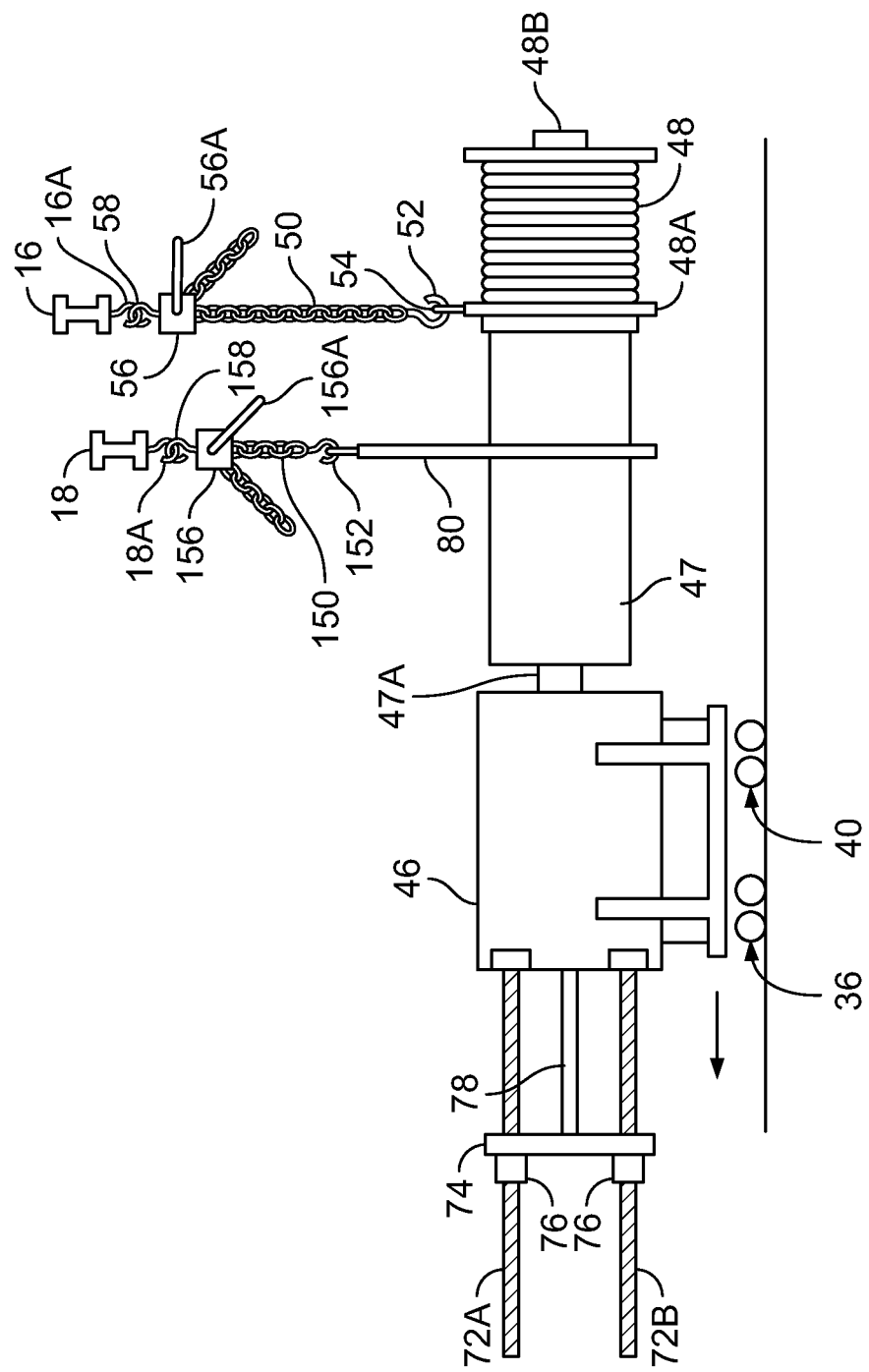
FIG. 9C is an elevational view illustrating a rotor separated from a stator to and completing the disassembly method using the system of FIG. 1.

FIGS. 9A through 9C show a disassembly process. Stator 46 is shown placed on carriage 36/40 in the manner previously described in connection with FIG. 5A, except that the previously mentioned rotor is already inside stator 46. As before, previously mentioned plate 54 is attached to an upper edge of flange 48A of sheave 48 (i.e., working at a portion of the sheave proximate the rotor). Plate 54 connects to previously mentioned hook 52 and to chain 50. Chain 50 is in turn connected to come-along winch 56 and hook 58. In this case however, hook 58 is connected to hitch 16A of crossbeam 16. In any event chain 50 acts as a line supplying rotor support and a lifting force at a first location.

A parallel pair of threaded shafts 72A and 72B each have a proximal end screwed into the left face (this view) of stator 46 at threaded sockets skewed 45° clockwise from vertical.

Through holes on stator brace 74 are slipped over shafts 72A and 72B. Brace 74 is captured by a pair of threaded adjusting nuts 76 threaded onto shafts 72A and 72B.

Previously mentioned hydraulic jack 68 is positioned against the inside of brace 74 with its piston rod 68A pressed against journal 47A of the rotor contained inside stator 46 (i.e., applying a force between brace 74 and the rotor). It will be appreciated that piston rod 68A of hydraulic actuator 68 can be extended to push journal 47A inwardly to dislodge the rotor inside stator 46. This action will be accommodated by motion of stator 46 and carriage 36/42 to the left (the direction indicated by arrow X in FIG. 9B, i.e., motion away from frame F and the rotor).

In FIG. 9B brace 74 has been repositioned outwardly by adjusting the nuts 76. This leaves additional room for the illustrated, longer hydraulic actuator 78, which connects between the inside of brace 74 and the no longer visible rotor journal (journal 47A of FIG. 9A). In FIG. 9B rotor 47 is shown partially dislodged from stator 46. To keep rotor 47 level, sling 80 is routed under the rotor at a second location and is connected to hook 152. Hook 152 is in turn connected through chain 150 to come-along winch 156, which has an upper hook 158 hooked onto previously mentioned hitch 18A of crossbeam 18.

Hitch lever 156A can be operated to produce an upward lifting force on rotor 47. In a manner analogous to that previously described in connection with FIG. 5B, winch 156 can be used to pivot rotor 47 about hook 52. Basically, winch 56 can be used to set the overall height of rotor 47 and winch 156 can set the angle of elevation. As before, a leveling device can be used to measure the alignment of rotor 47.

In FIG. 9B hydraulic actuator 78 has been fully extended. To enable further usage of actuator 78, it will be retracted and brace 74 will be moved inwardly to accommodate the reduced overall length of actuator 78.

In FIG. 9C brace 74 has been moved inwardly by adjusting the nuts 76. Consequently, hydraulic actuator 78 has been operated to push rotor 47 further out of stator 46. In fact, in FIG. 9C actuator 78 has pushed journal 47A so that rotor 47 is completely separated from stator 46.

Thereafter, the operator can remove actuator 78, brace 74, nuts 76 and threaded shafts 72A and 72B. Stator 46 can be lifted from carriage 36/40 with a crane or other device and moved to another location or simply lowered onto a dolly (neither crane nor dolly are shown).

Again, crossmember 22 (FIG. 1) can be temporarily removed so that a dolly (not shown) can be placed under rotor 47. Thereafter, winches 56 and 156 can be operated to lower rotor 47 onto the dolly. At this time, sling 80 may be removed, as well as hook 52 and plate 54.

Once the rotor 47 and stator 46 have been disassembled in this fashion, a technician can work on them and perform the appropriate maintenance and/or repairs. In the instance where the rotor and stator are part of a rotary machine that operates an elevator, the technician may choose to work in the room normally housing the rotary machine.

Once the repairs/maintenance are completed, the foregoing process of FIGS. 5A-5C can be performed to reassemble the rotary machine. Thereafter, the rotary machine can be moved back to its original position. The case of an elevator motor, the assembly can be mounted over the elevator shaft as before in order to operate an elevator.

It is appreciated that various modifications may be implemented with respect to the above described embodiments. While chains are described as being handled by come-along winches, in other embodiments stranded wire cables, ropes, etc. may be hoisted using different types of winches including winches employing electrical or hydraulic motors. In some embodiments the parallel pair of crossbeams may be replaced with a single, central beam that runs parallel to the carriage tracks and carries multiple hitches. Instead of a four-legged frame, some embodiments may employ a frame having a parallel pair of lateral panels. Arches may be used in the frames of other embodiments. In some embodiments the tracks can be secured independently from the frame. Instead of shackles, some embodiments may have holes or hooks that are used to connect external structure to the framework. While a rotor is shown supported at two locations, in some embodiments the support may be applied at more than two locations. Instead of hydraulic actuators, force may be applied by jackscrews, ratcheting devices, etc. While a J-shaped track is shown, other embodiments may have tracks that are convex on top or have a cross-section that is polygonal, rounded, U-shaped, etc. In some embodiments the carriage may be a four-wheeled cart with a single platform having guide members that steer the cart along the desired path.

Obviously, many modifications and variations of the present invention are possible in light of the above teachings. It is therefore to be understood that within the scope of the appended claims, the invention may be practiced otherwise than as specifically described.

The invention claimed is:

1. A system for handling a rotor and a stator of a rotary machine, comprising:
    a frame adapted to rest on a horizontal surface;
    a parallel pair of tracks adapted to rest on the horizontal surface and extend away from the frame; and
    a carriage riding on and guided by the pair of tracks, the carriage being adapted to carry the stator;
    wherein the frame has a parallel pair of struts and wherein each of the pair of tracks has a J-shaped cross-section and is connected to a different respective one of the struts; and
    wherein the length of the pair of tracks extending beyond the struts is adjustable.

2. A system according to claim 1, wherein the frame comprises:
    a spaced pair of parallel crossbeams; and
    four upright legs supporting the pair of crossbeams.

3. A system according to claim 2, wherein the pair of tracks are connected to the frame.

4. A system according to claim 3, wherein the parallel pair of struts are connected to a lower portion of the upright legs, a first adjacent pair of the upright legs being spanned by one of the pair of struts, the other one of the pair of struts spanning a second adjacent pair of the upright legs, the pair of crossbeams being transverse to the pair of struts.

5. A system according to claim 1, wherein the pair of tracks each has a distal end, the system further comprising:
    a cross-tie releaseably attached between the distal ends of the pair of tracks.

6. A system according to claim 5, wherein the pair of struts each have a distal end, the system further comprising:
    a cross member releaseably attached between the distal ends of the pair of struts, the cross member having a lower hitch.

7. A system according to claim 6, wherein the frame has a spaced pair of upper hitches.

8. A system according to claim 6, wherein the frame has a pair of legs, each having a rigging plate, each rigging plate having at least one aperture.

9. A system according to claim 5, wherein the carriage has a pair of trolleys, each of the trolleys having a support member connected between a pair of riders, each of the riders having a pair of wheels attached to a plate, and each of the tracks having a stop to limit inward movement of the carriage.

10. A system according to claim 9, wherein each of the pair of wheels has a cylindrical drum adjacent a concentric circular flange.

\* \* \* \* \*